United States Patent
Mittal et al.

(10) Patent No.: US 10,732,853 B2
(45) Date of Patent: Aug. 4, 2020

(54) DYNAMIC MEMORY MANAGEMENT TECHNIQUES

(71) Applicant: Oracle International Corporation, Redwood Shores, CA (US)

(72) Inventors: Ashish Mittal, Foster City, CA (US); Kenneth Khiaw Hong Eng, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 53 days.

(21) Appl. No.: 15/945,637

(22) Filed: Apr. 4, 2018

(65) Prior Publication Data

US 2018/0300067 A1    Oct. 18, 2018

Related U.S. Application Data

(60) Provisional application No. 62/484,795, filed on Apr. 12, 2017.

(51) Int. Cl.
*G06F 12/00* (2006.01)
*G06F 3/06* (2006.01)
(Continued)

(52) U.S. Cl.
CPC .......... *G06F 3/0613* (2013.01); *G06F 3/0631* (2013.01); *G06F 3/0656* (2013.01);
(Continued)

(58) Field of Classification Search
CPC .... G06F 3/0613; G06F 3/0631; G06F 3/0656; G06F 3/0673; G06F 12/0806; G06F 2212/1021; G06F 2212/62
See application file for complete search history.

(56) References Cited

U.S. PATENT DOCUMENTS

| 4,611,280 A | 9/1986 | Linderman |
| 5,487,166 A | 1/1996 | Cossock |

(Continued)

OTHER PUBLICATIONS

U.S. Appl. No. 15/951,002, Notice of Allowance dated Mar. 5, 2020, 9 pages.

(Continued)

*Primary Examiner* — Prasith Thammavong
(74) *Attorney, Agent, or Firm* — Kilpatrick Townsend & Stockton LLP

(57) ABSTRACT

Techniques for dynamically changing the amount of memory that is allocated to and used by processes (e.g., sorter processes) executed concurrently by a data processing system in a manner that is adaptive to the overall memory usage of the system. The ability to dynamically change the amount of memory that can be allocated to and used by individual processes increases and optimizes the overall memory utilization of the data processing system, which in turn results in the operations (e.g., sorting) performed by the processes to be performed in a more efficient manner. A memory manager is provided that is responsible for periodically collecting memory related information for the data processing system and for the processes (e.g., sorter processes) executed by the data processing system, and based on the collected information, for periodically and dynamically causing the memory used by the processes to be changed during the lifetime of the processes.

17 Claims, 12 Drawing Sheets

(51) Int. Cl.
  *G06F 12/0806* (2016.01)
  *G06F 12/02* (2006.01)
  *G06F 9/50* (2006.01)
  *G06F 11/34* (2006.01)
  *G06F 12/08* (2016.01)
  *G06F 12/0804* (2016.01)

(52) U.S. Cl.
  CPC .......... *G06F 3/0673* (2013.01); *G06F 9/5016* (2013.01); *G06F 11/34* (2013.01); *G06F 12/0223* (2013.01); *G06F 12/0806* (2013.01); *G06F 12/08* (2013.01); *G06F 12/0804* (2013.01); *G06F 2212/1016* (2013.01); *G06F 2212/1021* (2013.01); *G06F 2212/502* (2013.01); *G06F 2212/62* (2013.01)

(56) References Cited

U.S. PATENT DOCUMENTS

| | | | |
|---|---|---|---|
| 5,640,554 | A | 6/1997 | Take |
| 5,799,210 | A * | 8/1998 | Cohen ............... G06F 7/22 707/999.007 |
| 5,850,547 | A | 12/1998 | Waddington et al. |
| 5,852,826 | A | 12/1998 | Graunke et al. |
| 5,951,658 | A * | 9/1999 | Daray, Jr. ............ G06F 9/5016 710/52 |
| 6,105,024 | A | 8/2000 | Graefe et al. |
| 7,409,517 | B2 | 8/2008 | Dageville et al. |
| 7,496,572 | B2 | 2/2009 | Blaicher |
| 7,590,620 | B1 | 9/2009 | Pike et al. |
| 7,725,900 | B2 * | 5/2010 | Sauermann ........... G06F 9/5011 711/200 |
| 8,478,755 | B2 | 7/2013 | Lyon |
| 9,129,004 | B2 | 9/2015 | Yaroslavskiy et al. |
| 9,274,950 | B2 | 3/2016 | Graefe |
| 2003/0065688 | A1 * | 4/2003 | Dageville ............. G06F 16/217 |
| 2004/0073763 | A1 * | 4/2004 | Dageville ............. G06F 9/5016 711/170 |
| 2006/0064535 | A1 * | 3/2006 | Walker ................ G06F 13/1631 711/5 |
| 2006/0236046 | A1 * | 10/2006 | Bowers ................ H04N 19/162 711/159 |
| 2012/0254173 | A1 | 10/2012 | Graefe |
| 2013/0185337 | A1 * | 7/2013 | Lipcon ................ H04L 67/1097 707/813 |
| 2014/0006878 | A1 * | 1/2014 | Kalluri ..................... G06F 3/06 714/47.3 |
| 2017/0228319 | A1 | 8/2017 | Mueller et al. |
| 2017/0235614 | A1 * | 8/2017 | Choe .................... G06F 9/5077 718/104 |
| 2017/0249359 | A1 | 8/2017 | Abdelwahab |
| 2018/0150472 | A1 * | 5/2018 | Chen ..................... G06F 3/0652 |

OTHER PUBLICATIONS

Auger, et al., "Merge Strategies: from Merge Sort to TimSort", HAL archivepouvertes.fr, Dec. 9, 2015, hal-01212839v2, 15 pages.

Rhone; Stefanie, "Oracle Fusion Middleware, User's Guide for Oracle Data Visualization Desktop", Oracle, E70158-02, Oct. 2016, 96 pages.

Sinha, et al., "Cache-Efficient String Sorting Using Copying", School of Computer Science and Information Technology; RMIT University, Melbourne, Australia, 2006, 29 pages.

"Sorting Variable-Length Records—CA VM:SortTM—1.4—CA Technologies Documentation", documentation powered by DocOps, https://docops.ca.com/ca-vm-sort/1-4/en/using/sorting-andmerging-files/sorting-variable-length-records, retrieved on Jul. 25, 2017, 1 page.

"Sorting Variable Length Records", IBM i7.2, Sorting and Merging Files, https://www.ibm.com/support/knowledgecenter/en/ssw_ibm_i_72/rzase/cblsortvarlen.htm, retrieved on Jul. 26, 2017, 1 page.

* cited by examiner

DYNAMIC MEMORY MANAGEMENT TECHNIQUES

CROSS-REFERENCES TO RELATED APPLICATIONS

The present application is a non-provisional of and claims the benefit and priority under 35 U.S.C. 119(e) of U.S. Provisional Application No. 62/484,795 filed Apr. 12, 2017, entitled MEMORY ADAPTIVE SORT, the entire contents of which are incorporated herein by reference for all purposes.

BACKGROUND

In conventional systems, the manner in which system memory is allocated to processes executed by a system is not adaptive to the overall load on the system. In such conventional systems, the maximum memory that can be allocated to such processes is a fixed amount and cannot be changed, even when the system has a lot of unused system memory. This can result in underutilization of the memory that is physically available on the data processing system.

For example, a data processing system may execute multiple processes in parallel, with each of the multiple processes being configured to perform a particular operation, such as a sort operation. Generally, the maximum amount of memory that can be allocated to each of these sorter processes (or sorter) is fixed. For example, in a particular scenario, this maximum amount may be set to 64 MB. This number is fixed irrespective of how many sorter processes are executing at a time and also irrespective of the total memory usage for the data processing system executing the sorter processes. Since each sorter process can only be allocated up to the fixed amount of memory (e.g., 64 MB), in situations where the number of data items input to each sorter process for sorting is high, when the memory consumed by a sorter process reaches its allocation limit, the sorter has to write the sorted data to disk (also referred to as spilling to disk), in order to free up memory to sort more input data. Finally, each batch of the sorted data written to disk has to be read back from the desk and merged into the final sorted output data. The spilling to disk and reading back from disk is very costly from a time perspective, and very resource-intensive. Instead, it is preferable that each sorter can perform and complete its sorting operation fully in-memory (i.e., in system memory) without having to perform spilling.

In the example given above, the maximum memory that can be allocated to a sorter process cannot be changed even though there may be a large amount of unused and available system memory on the data processing system executing the sorter processes. This results in inefficient underutilization of the available memory on the data processing system and also makes the overall sorting process more resource and time-consuming due to more frequent spilling to disk.

Further, simply increasing the threshold for the maximum memory that can be allocated to a sorter process is not an adequate solution because the overall available memory for the data processing system is fixed and has to be shared between the sorter processes and other processes executed by the system. Setting this maximum memory threshold unnecessarily high could result in other processes being starved of essential memory resources and this may also adversely impact the overall functioning of the data processing system.

BRIEF SUMMARY

The present disclosure relates to memory management techniques, and more particularly to techniques for dynamically changing the amount of memory that is allocated to and used by processes (e.g., sorter processes) executed concurrently by a data processing system in a manner that is adaptive to the overall memory usage of the data processing system. The ability to dynamically change the amount of memory that can be allocated to and used by individual processes increases and optimizes the overall memory utilization of the data processing system, which in turn results in the operations (e.g., sorting) performed by the processes to be performed in a more efficient manner. Various inventive embodiments are described herein, including methods, systems, non-transitory computer-readable storage media storing programs, code, or instructions executable by one or more processors, and the like.

In certain embodiments, for the multiple processes executed by a data processing system, the system memory allocated and used by individual processes may be periodically dynamically changed during the lifetime of the processes. The dynamic changes may be made adaptive to criteria such as the load and overall memory usage of the data processing system, total memory usage of the individual processes (e.g., total memory usage of the sorter processes), and other like criteria.

In certain embodiments, a memory manager is provided that is responsible for periodically collecting memory related information for the data processing system and for the processes (e.g., sorter processes) executed by the data processing system, and based on the collected information, for periodically and dynamically causing the memory used by the processes to be changed during the lifetime of the processes. For example, if the processes are sorter processes (sorters), the memory manager may be configured to, on a periodic basis, collect memory usage information for the sorter processes, and to use this information to dynamically change the memory that can be allocated and used by individual sorter processes in a way that improves the overall utilization of available memory resources of the data processing system. The memory usage information for the sorter processes collected by the memory manager may include, without restriction, the memory used by each sorter process, the total memory used by the totality of sorter processes, the availability and amount of free memory (e.g., available memory buffers), and other like information.

In certain embodiments, the memory manager is configured to, on a periodic basis, calculate a threshold limit indicative of the maximum memory that can be used by each sorter. The sorters then adjust their memory usage based upon this threshold limit calculated by the memory manager. For example, if a sorter is determined to be using more memory than the threshold limit calculated by the memory manager, the sorter releases an amount of its memory such that it's resultant memory usage is less than or equal to the threshold limit calculated by the memory manager. Since the memory manager is configured to calculate this threshold limit on a periodic basis, the memory used by the individual sorters may also be changed dynamically on a periodic basis. This ability to dynamically change the system memory used by individual sorters results in better utilization of system memory resources while maximizing the amount of memory that can be used by the individual sorters with the goal of minimizing spilling of data to disk and instead increasing the likelihood that a sorter can perform the full sort in-memory, thereby saving on disk I/O and making the sorting operation more efficient.

In certain embodiments, the memory manager may also be configured to manage a list of usable buffers that can be used and reused by the sorter processes. For example, when a sorter releases and frees its memory, the freed memory buffers are released to the memory manager. The memory manager may add these freed buffers to a list of usable buffers maintained and managed by the memory manager. When a sorter process requests for additional memory (e.g., when the sorter needs memory for storing additional data items to be sorted), this additional memory may be allocated to the sorter from the list of usable buffers instead of the memory being allocated by a memory allocator.

In some embodiments, a computer-implemented method is disclosed that includes executing, by a data processing system, a plurality of sorters. Each sorter in the plurality of sorters may be configured to perform a sort operation. The data processing system may include one or more processors and associated memory. The method may further include executing, by the data processing system, a memory manager. The memory manager may determine a current memory usage for each sorter in the plurality of sorters. Based upon the current memory usage determined for each sorter in the plurality of sorters, the memory manager may determine a first sorter total value indicative of the total memory usage of the plurality of sorters. The method may further include determining that the first sorter total value exceeds a first threshold value. Responsive to determining that the first sorter total value exceeds the first threshold, the memory manager may calculate a first per-sorter limit value based upon the first sorter total value and the first threshold value. For each sorter in the plurality of sorters whose current memory usage exceeds the first per-sorter limit value, the method may further include releasing an amount of memory used by the sorter, wherein an amount of memory used by the sorter after the releasing is equal to or less than the first per-sorter limit.

In some embodiments, the method may further include, for each sorter in the plurality of sorters whose memory usage exceeds the first per-sorter limit value, providing the memory released from the sorter to the memory manager and adding, by the memory manager, the memory released from the sorter to a list of buffers managed by the memory manager. In some embodiments, the releasing of memory may involve releasing an amount of memory used by a first sorter from the plurality of sorters, wherein an amount of memory used by the first sorter after the releasing is equal to or less than the first per-sorter limit. In some embodiments, the providing involves providing the memory released from the first sorter to the memory manager. In some embodiments, the adding involves adding the memory released from the first sorter to the list of buffers managed by the memory manager. In some embodiments, the method may further include executing, by the data processing system, a memory allocator, the memory allocator configured to allocate memory for the plurality of sorters, wherein the memory freed by the first sorter is memory allocated to the first sorter by the memory allocator. In some embodiments, the method may further include receiving, by the memory manager, a request for memory from a second sorter from the plurality of sorters. In some embodiments, the method may further include, responsive to receiving the request, providing to the second sorter by the memory manager from the list of buffers, a portion of memory released from the first sorter.

In some embodiments, the method may further include executing, by the data processing system, a memory allocator, the memory allocator configured to allocate memory for the plurality of sorters, wherein the memory released by the first sorter is memory allocated to the first sorter by the memory allocator. In some embodiments, upon determining that the first sorter total value exceeds the first threshold value, the method may include releasing, by the memory manager, the list of buffers to the memory allocator. In some embodiments, the method may involve determining, by the memory manager, a first parameter configured for the data processing system, the first parameter identifying a maximum amount of memory that can be used on the data processing system for sorting operation. In some embodiments, the method may involve determining, by the memory manager, a second parameter configured for the data processing system, the second parameter identifying a memory usage threshold when corrective actions to adjust memory usage of the plurality of sorters is to be performed. In some embodiments, determining the first threshold value may be based upon the first parameter and the second parameter.

In some embodiments, calculating the first per-sorter limit value may include determining, by the memory manager, based on the first sorter total value and the first threshold value, a target total memory value indicative of an amount of memory to release. In some embodiments, calculating the first per-sorter limit value may include determining, by the memory manager, a subset of sorters from the plurality of sorters, wherein each sorter from the plurality of sorters whose current memory usage exceeds the target total memory value is included in the subset of sorters. In some embodiments, calculating the first per-sorter limit value may include determining, by the memory manager, the first per-sorter limit value based on the sorters in the subset of sorters and their current memory usages, and the target total memory value.

In some embodiments, the method may further include after expiration of a period of time after calculation of the first per-sorter limit value: determining, by the memory manager, an updated current memory usage for each sorter in the plurality of sorters. Based upon the updated current memory usage determined for each sorter in the plurality of sorters, the memory manager may determine a second sorter total value indicative of the total memory usage of the plurality of sorters. The method may further include determining that the second sorter total value exceeds the first threshold value. Responsive to determining that the second sorter total value exceeds the first threshold, the memory manager may calculate a second per-sorter limit value based upon the second sorter total value and the first threshold value, wherein the second per-sorter limit value is different from the first per-sorter limit value. For each sorter in the plurality of sorters whose updated memory usage exceeds the second per-sorter limit value, the method may include releasing an amount of memory used by the sorter, wherein an amount of memory used by the sorter after the releasing is equal to or less than the second per-sorter limit.

In some embodiments, determining the current memory usage for each sorter in the plurality of sorters may involve for each sorter in the plurality of sorters, the sorter communicating its current memory usage information to the memory manager. In some embodiments, releasing the amount of memory used by the sorter is performed by the sorter.

In some embodiments, a non-transitory computer-readable medium is disclosed that contains instructions that, when executed by a processor, causes the processor to:

execute a plurality of sorters, each sorter in the plurality of sorters configured to perform a sort operation, the data processing system comprising one or more processors and associated memory; execute a memory manager; determine, by the memory manager, a current memory usage for each sorter in the plurality of sorters; based upon the current memory usage determined for each sorter in the plurality of sorters, determine, by the memory manager, a first sorter total value indicative of the total memory usage of the plurality of sorters; determine that the first sorter total value exceeds a first threshold value; responsive to determining that the first sorter total value exceeds the first threshold, calculate, by the memory manager, a first per-sorter limit value based upon the first sorter total value and the first threshold value; and for each sorter in the plurality of sorters whose current memory usage exceeds the first per-sorter limit value, release an amount of memory used by the sorter, wherein an amount of memory used by the sorter after the releasing is equal to or less than the first per-sorter limit.

In some embodiments, the instructions, when executed by the processor, further cause the processor to: for each sorter in the plurality of sorters whose memory usage exceeds the first per-sorter limit value: provide the memory released from the sorter to the memory manager; and add, by the memory manager, the memory released from the sorter to a list of buffers managed by the memory manager. In some embodiments, the releasing involves releasing an amount of memory used by a first sorter from the plurality of sorters, wherein an amount of memory used by the first sorter after the releasing is equal to or less than the first per-sorter limit. In some embodiments, the providing involves providing the memory released from the first sorter to the memory manager. In some embodiments, the adding involves adding the memory released from the first sorter to the list of buffers managed by the memory manager.

In some embodiments, the instructions, when executed by the processor, further cause the processor to: execute, by the data processing system, a memory allocator, the memory allocator configured to allocate memory for the plurality of sorters, wherein the memory freed by the first sorter is memory allocated to the first sorter by the memory allocator; receive, by the memory manager, a request for memory from a second sorter from the plurality of sorters; and responsive to receiving the request, provide to the second sorter by the memory manager from the list of buffers, a portion of memory released from the first sorter.

In some embodiments, the instructions, when executed by the processor, further cause the processor to: execute, by the data processing system, a memory allocator, the memory allocator configured to allocate memory for the plurality of sorters, wherein the memory released by the first sorter is memory allocated to the first sorter by the memory allocator. Upon determining that the first sorter total value exceeds the first threshold value, the memory manager may release the list of buffers to the memory allocator. In some embodiments, the instructions, when executed by the processor, further cause the processor to: determine, by the memory manager, a first parameter configured for the data processing system, the first parameter identifying a maximum amount of memory that can be used on the data processing system for sorting operation. The memory manager may determine a second parameter configured for the data processing system, the second parameter identifying a memory usage threshold when corrective actions to adjust memory usage of the plurality of sorters is to be performed. The instructions may further cause the processor to determine the first threshold value based upon the first parameter and the second parameter.

In some embodiments, the instructions, when executed by the processor, further cause the processor to: determine, by the memory manager, based on the first sorter total value and the first threshold value, a target total memory value indicative of an amount of memory to release; determine, by the memory manager, a subset of sorters from the plurality of sorters, wherein each sorter from the plurality of sorters whose current memory usage exceeds the target total memory value is included in the subset of sorters; determine, by the memory manager, the first per-sorter limit value based on the sorters in the subset of sorters and their current memory usages, and the target total memory value.

In some embodiments, a data processing system is disclosed for performing a memory adaptive sort, the system including one or more processors and associated memory, a plurality of sorters, each sorter in the plurality of sorters configured to perform a sort operation, and a memory manager. Each sorter in the plurality of sorters is further configured to determine a current memory usage of the respective sorter exceeds a first per-sorter limit value, and release an amount of memory used by the respective sorter, wherein an amount of memory used by the sorter after the releasing is equal to or less than the first per-sorter limit. The memory manager is further configured to determine the current memory usage for each sorter in the plurality of sorters, based upon the current memory usage determined for each sorter in the plurality of sorters, determine a first sorter total value indicative of the total memory usage of the plurality of sorters, determine that the first sorter total value exceeds a first threshold value, and responsive to determining that the first sorter total value exceeds the first threshold, calculate the first per-sorter limit value based upon the first sorter total value and the first threshold value.

In some embodiments, each sorter in the plurality of sorters is further configured to provide the memory released from the respective sorter to the memory manager, and wherein the memory manager is further configured to add the memory released from each sorter in the plurality of sorters to a list of buffers managed by the memory manager. In some embodiments, the memory manager is further configured to determine a first parameter configured for the data processing system, the first parameter identifying a maximum amount of memory that can be used on the data processing system for sorting operation, determine a second parameter configured for the data processing system, the second parameter identifying a memory usage threshold when corrective actions to adjust memory usage of the plurality of sorters is to be performed, and determine the first threshold value based upon the first parameter and the second parameter.

In some embodiments, the memory manager is further configured to determine based on the first sorter total value and the first threshold value, a target total memory value indicative of an amount of memory to release, determine a subset of sorters from the plurality of sorters, wherein each sorter from the plurality of sorters whose current memory usage exceeds the target total memory value is included in the subset of sorters, and determine the first per-sorter limit value based on the sorters in the subset of sorters and their current memory usages, and the target total memory value.

In some embodiments, the memory manager is further configured to, after expiration of a period of time after calculation of the first per-sorter limit value: determine an updated current memory usage for each sorter in the plurality of sorters; based upon the updated current memory usage determined for each sorter in the plurality of sorters, determine a second sorter total value indicative of the total memory usage of the plurality of sorters; determine that the second sorter total value exceeds the first threshold value; and responsive to determining that the second sorter total value exceeds the first threshold, calculate a second per-sorter limit value based upon the second sorter total value and the first threshold value, wherein the second per-sorter limit value is different from the first per-sorter limit value.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Systems depicted in some of the figures may be provided in various configurations. In certain embodiments, the systems may be configured as a distributed system where one or more components of the system are distributed across one or more networks in a cloud computing system. In certain embodiments, the systems may be configured to operate in virtual or non-virtual environments.

The present disclosure relates to memory management techniques, and more particularly to techniques for dynamically changing the amount of memory that is allocated to and used by processes (e.g., sorter processes) executed concurrently by a data processing system in a manner that is adaptive to the overall memory usage of the data processing system. The ability to dynamically change the amount of memory that can be allocated to and used by individual processes increases and optimizes the overall memory utilization of the data processing system, which in turn results in the operations (e.g., sorting) performed by the processes to be performed in a more efficient manner. Various inventive embodiments are described herein, including methods, systems, non-transitory computer-readable storage media storing programs, code, or instructions executable by one or more processors, and the like.

In certain embodiments, for the multiple processes executed by a data processing system, the system memory allocated and used by individual processes may be periodically dynamically changed during the lifetime of the processes. The dynamic changes may be made adaptive to criteria such as the load and overall memory usage of the data processing system, total memory usage of the individual processes (e.g., total memory usage of the sorter processes), and other like criteria.

Figure 1:
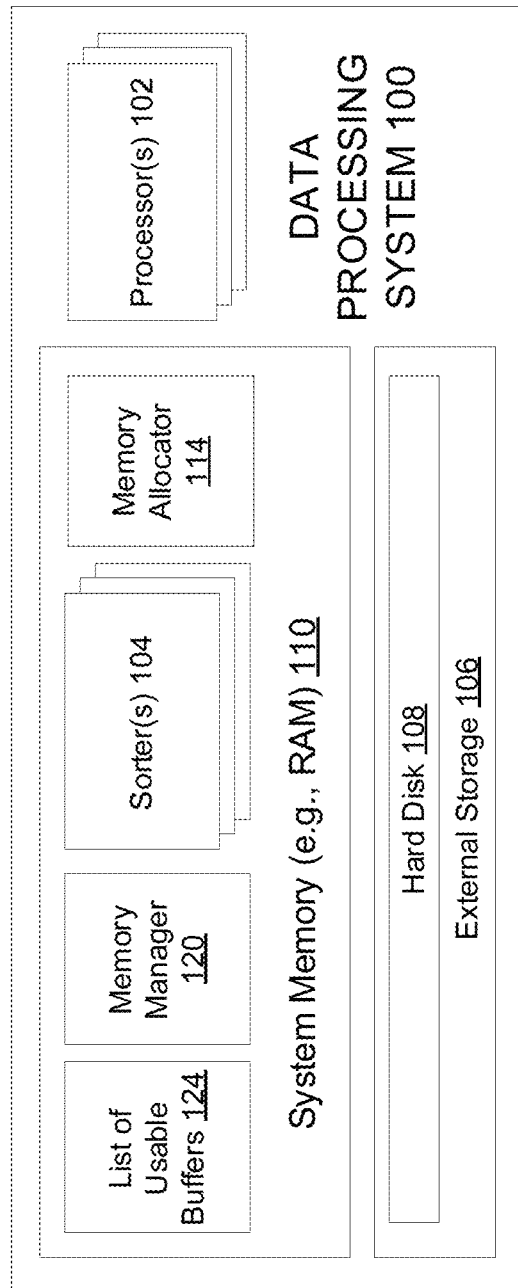
FIG. 1 is a simplified block diagram of a data processing system capable of performing dynamic memory management processing according to certain embodiments.

FIG. 1 is a simplified block diagram of a data processing system 100 capable of performing dynamic memory management processing according to certain embodiments. Data processing system 100 depicted in FIG. 1 is merely an example and is not intended to unduly limit the scope of claimed embodiments. One of ordinary skill in the art would recognize many possible variations, alternatives, and modifications. For example, in some implementations, data processing system 100 may have more or fewer systems or components than those shown in FIG. 1, may combine two or more systems, or may have a different configuration or arrangement of systems. In some embodiments, the data processing system 100 may be a server or cloud computing cluster, such as a backend server designed to process queries of a database. Data processing system 100 may include one or more computer systems or devices.

As depicted in FIG. 1, data processing system 100 may include hardware elements such as processor(s) 102, system memory 110 (e.g., RAM), and/or external storage 106. System memory 110 may provide memory resources for processors 102. System memory 110 is typically a form of volatile random access memory (RAM) (e.g., dynamic random access memory (DRAM), Synchronous DRAM (SDRAM), Double Data Rate SDRAM (DDR SDRAM)). External storage 106 may include non-volatile memory to store data that is to be persisted. External storage 106 may come in different forms such as a hard disk 108, a floppy disk, flash memory, a solid-state drive or disk (SSD), a USB flash drive, a memory card, a memory stick, a tape cassette, a zip cassette, a computer hard drive, CDs, DVDs, Network-attached storage (NAS), memory storage provided via a Storage Area Network (SAN), and the like.

Information related to an operating system and applications or processes executed by processors 102 may be loaded in system memory 110. For example, one or more applications and processes executed by data processing system 100 may be loaded into system memory 110. For example, as depicted in FIG. 1, multiple sorter processes 104 may be loaded in system memory 110 and executed concurrently by processor(s) 102 of data processing system 100. As shown in FIG. 1, other objects loaded in system memory 110 and executed by one or more processors 102 include a memory manager 120 and a memory allocator 114.

The processor(s) 102 may be configured to execute or run instructions (e.g., code, code objects) for implementing the functions performed by data processing system 100. These functions may include database-related tasks, sorting functions, and the like. Processors 102 may include single core processors or multicore processors. Processors 102 may execute one or more virtual machines.

As depicted in FIG. 1, sorters(s) 104 may represent one or more processes executed by data processing system 100 for performing sort operations. Each sorter 104 may have input/output (I/O) access capabilities with the system memory 110 and/or external storage 106. Multiple sorters may be executed concurrently. Each sorter 104 may receive a set of data records (e.g., a "chunk") that the sorter may be tasked with performing a sort operation on. Since sorters 104 may execute in parallel, each sorter may receive its own subset of records and perform the sort operation on the records. In this manner, multiple sorting operations may be performed in parallel by the multiple sorters 104.

A sort operation, which is quite ubiquitous in computer processing, may involve the process of arranging a set of data items (also referred to as data records) in a sequence or sets according to some criterion. Sorting may involve ordering, which is the arranging of data items in a sequence ordered, by some criterion.

Memory allocator 114 may be configured to allocate memory to processes executed by data processing system 100. For example, memory allocator 114 may be configured to allocate memory (e.g., memory buffers) to each sorter 104 upon receiving a memory request from the sorter. The memory may be allocated from the system memory available on data processing system 100.

In certain embodiments, memory allocator 114 may be able to communicate with memory manager 120. For example, memory allocator 114 may inform memory manager 120 about the amount of memory allocated to each sorter 104. In some embodiments, memory manager 120 may request this information from memory allocator 114. Memory manager 120 may then use this information to perform its memory management functions, as described below. In addition to allocating memory for sorters 104, memory allocator 114 may also be configured to allocate system memory to other processes executed by data processing system 100.

In some embodiments, memory manager 120 is configured to perform processing for controlling the amount of system memory that can be allocated to and used by sorters 104. The processing performed by memory manager 120 may include periodically collecting system memory related information for data processing system 100 and for sorter processes 104 executed by data processing system 100. The system memory-related determined by memory manager 120 may include, for example, the memory usage of each sorter 104, the total memory usage of sorters 104, the load and memory usage of data processing system 100, and other system memory related parameters. In some embodiments, each sorter may be configured to monitor its own memory usage. Memory manager 100 may then query a sorter to determine the sorter's memory usage.

Based on the collected information and also upon configuration information configured for data processing system 100, memory manager 120 may periodically and dynamically cause the memory used by individual sorters 104 to be changed during the lifetime of the sorters in a way that improves the overall utilization of available memory resources of data processing system 100 while ensuring that each sorter has the maximum memory possible so as to minimize the possibility of the sorter having to spill data to disk, while further enduring that no process executed by data processing system 100 is starved of system memory. The configuration information used by memory manager 120 may be stored in a configuration file accessible to memory manager 120.

In certain embodiments, on a periodic basis and based upon the collected information, memory manager is configured to, on a periodic basis, calculate a threshold limit indicative of the maximum memory that can be used by each sorter. Sorters 104 may then adjust their memory usage responsive to the this threshold limit calculated by memory manager 120. For example, if a sorter is currently using more system memory than the threshold limit calculated by memory manager 120, the sorter releases an amount of its used memory such that its resultant memory usage is less than or equal to the threshold limit calculated by memory manager 120. Since memory manager 120 is configured to calculate this threshold limit on a periodic basis, the memory used by individual sorters 104 may also be changed dynamically on a periodic basis. This ability to dynamically change the system memory used by individual sorters 104 results in better utilization of system memory resources of data processing system 100 while maximizing the amount of memory that can be used by the individual sorters with the goal of minimizing the possibility of the sorters having to spill data to disk and instead increasing the likelihood that a sorter can perform the full sort in-memory. This in turn saves on disk I/O and making the sorting operation more efficient.

In certain embodiments, memory manager 120 is configured to manage a list of usable buffers 124, where each buffer may be a contiguous chunk of system memory 110. When a sorter releases and frees its memory responsive to a change in its allowed memory usage, the freed memory buffers may be released by the sorter to memory manager 120 instead of to memory allocator 114. Memory manager 120 may add these freed buffers to the list of usable buffers 124 maintained and managed by memory manager 120. When a sorter process 104 requests for additional memory (e.g., when the sorter needs memory for storing additional data items to be sorted), and the amount of requested memory is available in list 124, then memory manager 120 may allocate the requested memory to the requesting sorter from list 124 instead of the memory being allocated by memory allocator 114. This reduces the number of calls to memory allocator 114, thereby reducing contention on memory allocator 114 for better scalability. The list of usable buffers 124 represents memory that is reusable by sorters 104.

In some embodiments, each of the sorter(s) 104 may, after being instantiated, may register with memory manager 120. This enables memory manager 120 to know which sorters are being executed by data processing system 100 at any point in time.

Figure 2:
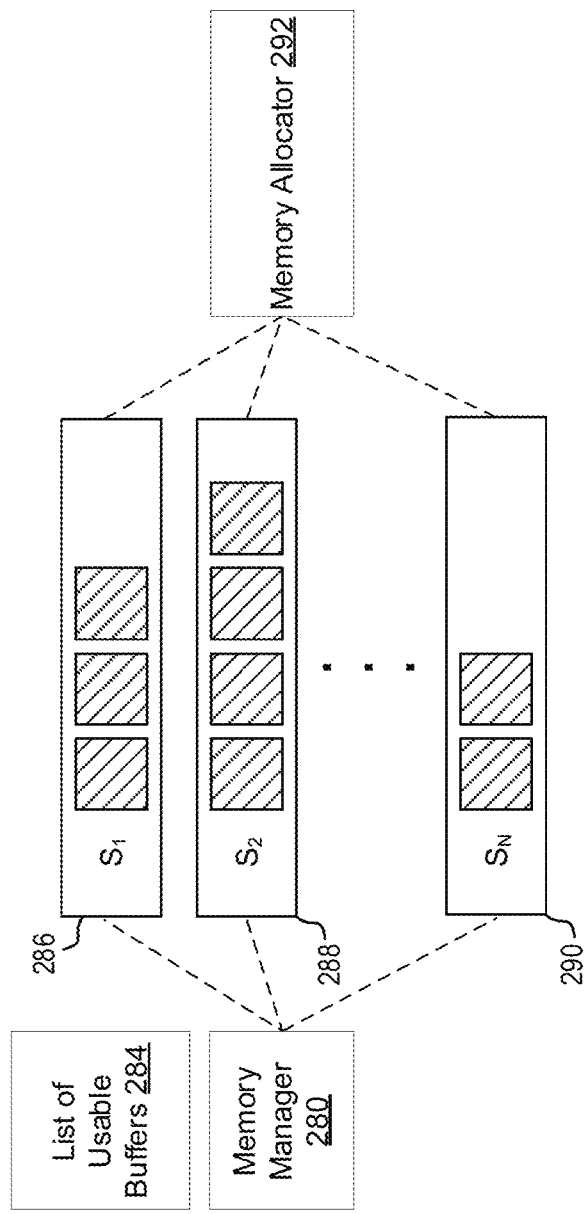
FIG. 2 is another simplified block diagram of certain components used for dynamically managing the memory used by sorters according to certain embodiments.

FIG. 2 is another simplified block diagram of certain components used for dynamically managing the memory used by sorters according to certain embodiments. The embodiment depicted in FIG. 2 is merely an example and is not intended to unduly limit the scope of claimed embodiments. One of ordinary skill in the art would recognize many possible variations, alternatives, and modifications. For example, in some implementations, more or fewer systems or components than those shown in FIG. 2 may be present, may combine two or more systems, or may have a different configuration or arrangement of systems.

In the embodiment depicted in FIG. 2, multiple sorters (S1-SN) are being executed, including a first sorter 286, a second sorter 288, and a Nth sorter 290. As an example, a database query may generate a lot of data records, subsets of which may then be input to each of sorters S1-SN for sorting. Each sorter may thus receive a subset (chunk) of the total data records and may perform the sort operation on its input subset.

A memory manager 280 is provided for dynamically managing the memory usage of each sorter. Memory manager 280 may periodically collecting system memory related information for sorters S1-SN including the memory usage of each sorter, the total memory usage of sorters 104, and other system memory related parameters. In some embodiments, each sorter may be configured to monitor its own memory usage. Memory manager 100 may then query each sorter to determine the sorter's memory usage, and then calculate the combined memory usage of all the sorters S1-SN. In some embodiments, memory manager 280 may keep a registry of all the sorters and, for each sorter, the sorter's used memory. Every time (e.g., periodically) memory manager 280 wakes up (e.g., to perform the necessary calculations), memory manager 280 may query each sorter on how much memory it is using and update its registry.

In certain embodiments, on a periodic basis and based upon the collected information, memory manager is configured to, calculate a threshold limit indicative of the maximum memory that can be used by each sorter. Sorters S1-SN may then adjust their memory usage responsive to this threshold limit calculated by memory manager 280. For example, if a sorter is currently using more system memory than the threshold limit calculated by memory manager 280, the sorter releases an amount of its used memory such that its resultant memory usage is less than or equal to the threshold limit calculated by memory manager 280.

Memory manager 280 may also maintain and manage a list of usable buffers 284. In certain embodiments, when a sorter releases and frees its memory responsive to a change in its allowed memory usage, the freed memory buffers may be released by the sorter to memory manager 280 and added to the list of buffers 284. The list of buffers 284 may then be used to satisfy a sorter's need for additional memory instead of the sorter having to get the memory from memory allocator 292. When a sorter needs additional memory, the sorter may communicate with the memory manager 280 to obtain memory from the list of usable buffers 284, if possible. Memory from list 284 is then provided to the requesting sorter. However, if the list of usable buffers 284 is empty or does not have enough memory to satisfy the sorter's request, the sorter may get that memory from memory allocator 292. After a sorter completes its tasks and its memory usage is reduced, it may then return that memory to memory manager 280 to add to list of usable buffers 284.

Figure 3:
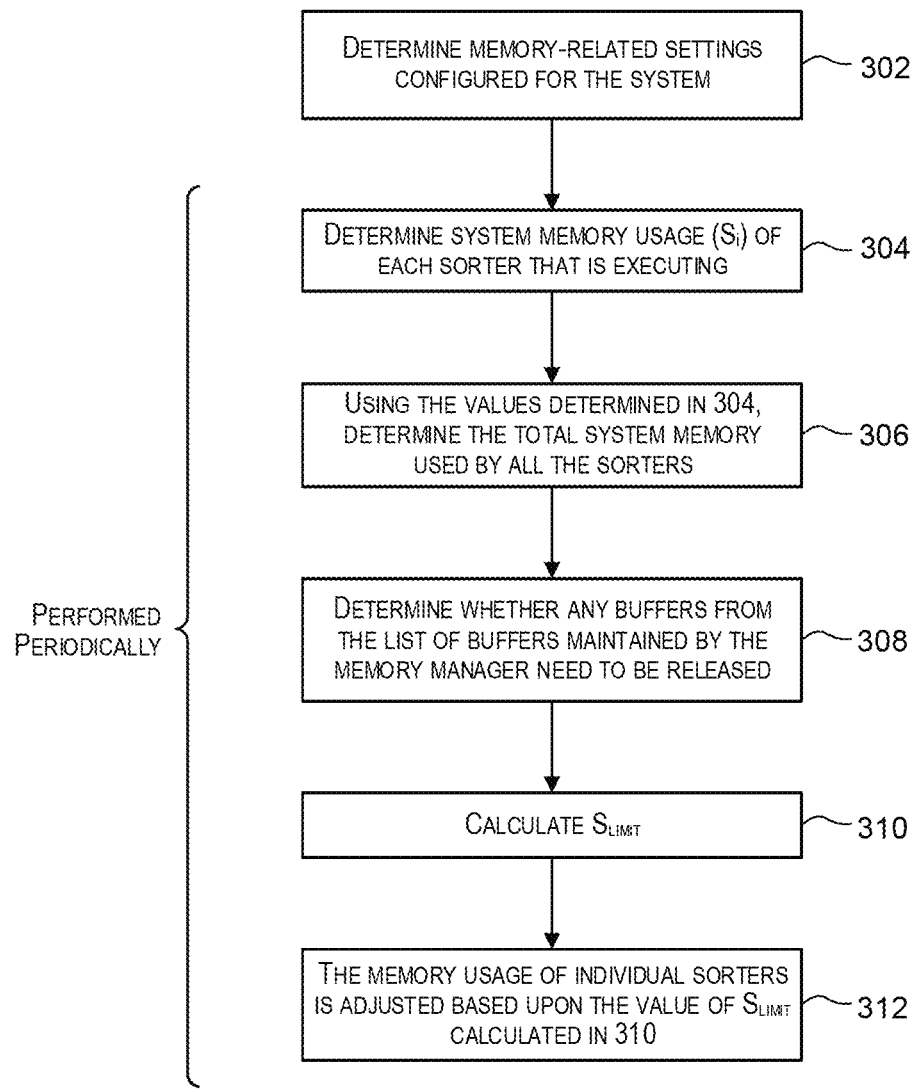
FIG. 3 depicts a simplified flow chart depicting processing performed for dynamically managing the memory used by sorters executing in parallel according to certain embodiments.

FIG. 3 depicts a simplified flow chart depicting processing performed for dynamically managing the memory used by sorters executing in parallel according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1 and 2, the processing depicted in FIG. 3 may be performed by memory manager 120, 280 and sorters 104, S1-SN. In certain embodiments, the processing shown in 302, 304, 306, 308, and 310 may be performed by a memory manager, and the processing performed in 312 may be performed by the individual sorters.

At 302, the memory manager may determine system memory-related settings configured for the data processing system that affect the memory management tasks performed by the memory manager. In some embodiments, these settings may be stored in a configuration file that is accessible and readable by the memory manager. Table A shown below identifies some of the memory-related settings that may be set for a data processing system and read by the memory manager in 302. The list provided in Table A below is meant to be illustrative and not restrictive or limiting in any manner. In other embodiments, other additional parameters may be configured or a subset of the parameters shown in Table A may be configured, or a different set of parameters may be configured.

TABLE A

Configuration Parameters

| Parameter | Description |
| --- | --- |
| MEMORY_MANAGER_MAX_SIZE | This parameter defines the maximum amount of memory that can be used on the data processing system for sorting. This value thus defines the maximum amount of memory that can be distributed across the multiple sorters. For example, in one instance, this threshold may be set to 2 GB. This parameter is configurable by a user of the data processing system. If a value for this parameter is not explicitly specified, a default value may be used. This value is generally the same during the runtime of the data processing system. |
| T | This parameter identifies a memory usage threshold where corrective actions to adjust memory usage of the sorters will kick in. This parameter is typically represented as a percentage of the MEMORY_MANAGER_MAX_SIZE parameter. For example, in one instance, it may be configured to 80% of MEMORY_MANAGER_MAX_SIZE. In some embodiments, this parameter is |

TABLE A-continued

Configuration Parameters

| Parameter | Description |
|---|---|
| | configurable by a user of the data processing system. If a value for this parameter is not explicitly specified, a default value may be used. This value is generally the same during the runtime of the data processing system. |
| $S_{min}$ | This parameter identifies the minimum amount of memory that is guaranteed to each sorter. This ensures that sorters that are performing small sorts are not starved for memory. For example, in some instances, the value for this parameter may be set to 4 MB. This parameter is configurable by a user of the data processing system. If a value for this parameter is not explicitly specified, a default value may be used. |
| $S_{max}$ | This parameter identifies a hard maximum limit on the memory that a sorter can use. For example, in some instances, the value for this parameter may be set to 1 GB. |

The processing in 304, 306, 308, 310, and 312 may be performed periodically. In certain embodiments, this may be implemented using a background thread that is configured to wake up periodically and perform the processing. As an example, the processing may be performed every 25 milliseconds (ms). Accordingly, in this embodiment, 304, 306, 308, 310, and 312 may be performed every 25 ms. It is to be noted that the sorters themselves may be persistent in memory for varying periods of time. For example, the sorters may be persistent in memory and live for longer than 25 ms, such as for 1 s, 2 s, 100 s, and so forth. The sorters may come in and out of existence and each sorter may consume memory incrementally as the sort operation progresses.

At 304, the memory manager determines the memory usage of each sorter (denoted as $S_i$, where "i" is each sorter's identity) that is currently being executed by the data processing system. In some embodiments, each sorter may be configured to keep track of its own memory usage, and as part of the processing performed in 304, the memory manager may query each sorter for that sorter's memory usage.

As previously described, each sorter, when instantiated, may register with the memory manager. The memory manager may use this registry information to determine the sorters that are to be queried as part of the processing performed in 304. In other embodiments, the memory manager may use other techniques to determine the sorters that are currently being executed by the data processing system.

At 306, based upon the individual sorter memory usage values determined in 304, the memory manager determines a total memory usage ($\Sigma S_i$) of all the sorters being executed by the data processing system.

At 308, processing is performed to determine whether any buffers from the list of buffers maintained by the memory manager need to be released to the memory allocator. Further details related to the processing performed in 308 are provided below.

At 310, the memory manager calculates an appropriate memory limit threshold ($S_{limit}$)(also sometimes referred to as a global individual sorter limit) that all sorters must adhere to. This threshold value is calculated based upon the total memory usage of the sorters determined in 306, based upon the memory usages of individual sorters determined in 304, and based upon configuration parameters determined in 302. Further details related to how the $S_{limit}$ is determined are provided below.

In certain embodiments, $S_{limit}$ may be calculated with a goal to bring the total amount of memory used by the sorters to be equivalent to the load of the data processing system executing the sorters. In certain embodiments, $S_{limit}$ may be set as high as possible so as to allow each sorter to have as much memory as possible, while adhering to the constraints, so as to minimize disk spilling for the sorters.

At 312, the memory usage of one or more of the sorters is adjusted based upon the value of $S_{limit}$ calculated a 310. In some embodiments, each sorter may be configured to check the latest value of $S_{limit}$, compare its own current memory usage, and take appropriate actions, which may include reducing its memory usage to comply with the value of $S_{limit}$, or do nothing. The different sorters executing concurrently may be using varying amounts of memory, and thus the adjustments, if any, made by one sorter may be different from the adjustments made by another sorter based upon the same value of $S_{limit}$.

In certain embodiments, the actions taken in 312 may depend on the value of $S_{limit}$ and also upon the values of configuration parameters determined in 302. For example, as previously described, the $S_{min}$ parameter may indicate a minimum amount of memory that each sorter must be allocated. If this minimum is not met (e.g., $S_{limit}$ is less than this $S_{min}$ minimum value) for a sorter, then the global limit $S_{limit}$ may be ignored for that sorter to ensure that the sorter has enough memory to work with. This enables a sorter performing a sort operation entering the system to be always guaranteed some memory even if the system is at capacity.

In certain embodiments, each sorter may periodically check (e.g., at the same periodicity that $S_{limit}$ is refreshed, such as every 25 ms) the value of $S_{limit}$ (e.g., calculated and maintained by the memory manager) to determine a course of action to take. In other embodiments, as each sorter receives new input data for sorting, it may check the latest value of $S_{limit}$ computed by the memory manager to determine the right course of action.

Figure 4:
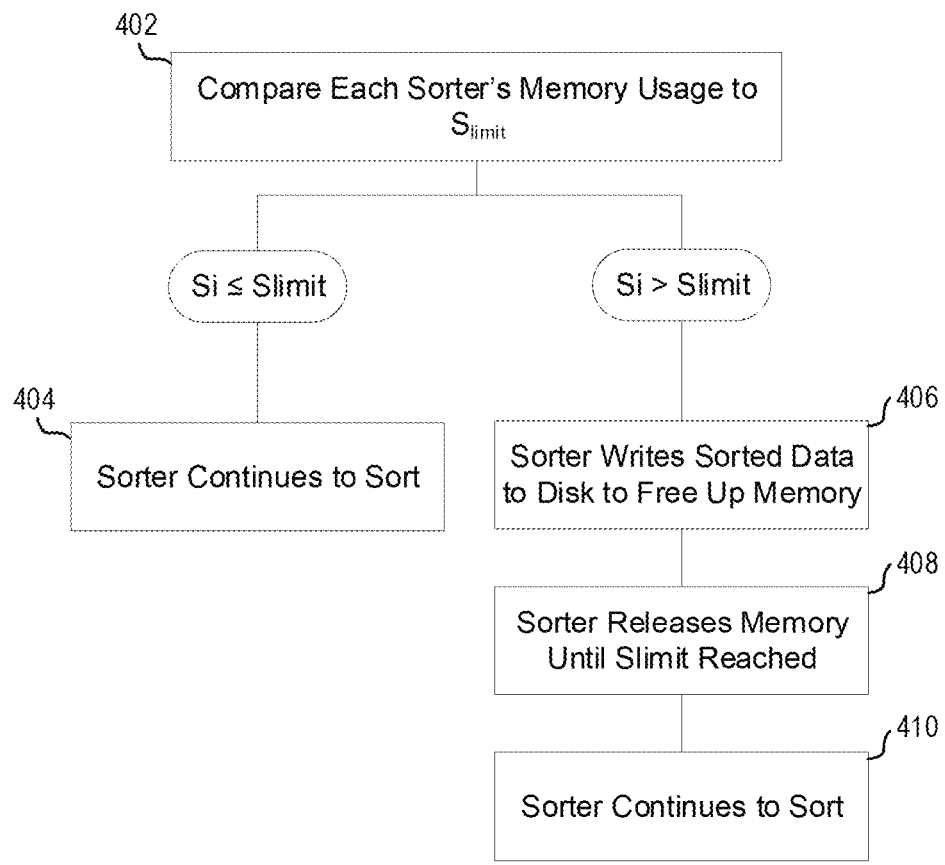
FIG. 4 depicts a simplified flow chart depicting processing that may be performed as part of 312 of FIG. 3 in certain embodiments.

FIG. 4 depicts a simplified flow chart depicting processing that may be performed as part of 312 of FIG. 3 in certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, the processing may be performed by the sorters, or by the sorters in cooperation with the memory manager.

As depicted in FIG. 4, at 402, each sorter may compare the sorter's current individual memory usage ($S_i$) with the latest value of $S_{limit}$ calculated by the memory manager. If it is determined in 402, that the sorter's memory usage is less than or equal to then at 404, the sorter will proceed or continue to sort the data in memory without making any memory changes. Alternatively, if it is determined in 402, that the sorter's memory usage $S_i$ is greater than $S_{limit}$, then at 406, the sorter may wrap up its current sort operation and/or spill data to persistent storage (e.g., disk) so that a certain amount of memory can be released. At 408, the sorter releases an amount of its memory such that after the release the memory used by the sorter is equal to or less than $S_{limit}$. At 410, the sorter may then continue to start sorting the next batch of input data in memory.

In certain embodiments, the memory buffers released by a sorter in 312 are provided by the sorter to the memory manager instead of to the memory allocator, which may have allocated some of the buffers to sorter before the buffers being released or freed. The memory manager may add these freed buffers to the list of usable free buffers maintained by the memory manager. Sorters can then reuse these buffers from the list, if available, by requesting them from the memory manager. Accordingly, memory freed from one sorter and added to the list of buffers can be allocated by the memory manager to another sorter in response to the memory manager receiving a memory request from the another sorter. Thus, the buffers from this list, when available, may be used to satisfy memory requests from the sorters instead of using the memory allocator. As previously indicated, this reduces the number of calls to the memory allocator, thereby reducing contention on the memory allocator for better scalability.

As previously described, at 308 in FIG. 3, processing is performed to determine whether any buffers from the list of buffers maintained by the memory manager need to be released to the memory allocator. As part of this processing, the memory manager may first may determine the total amount memory (B) being occupied by the buffers in the list of buffers. The memory manager may then determine a maximum value ($B_{max}$). The value ($B-B_{max}$) then indicates the size of memory that is released by the memory manager to the memory allocator. In certain embodiments, the memory manager may compute the value of $B_{max}$ as follows:

--- if ($\Sigma S_i > T$)
$B_{max} = 0$
else
$B_{max} = \min(\Sigma S_i, (T - \Sigma S_i))$

---

The above equation is captures the following logic: if the total memory usage of all sorters is above T (i.e., the parameter from Table A that identifies a memory usage threshold where corrective actions to adjust memory usage of the sorters will kick in, and is typically defined as a percentage of MEMORY_MANAGER_MAX_SIZE), all buffers maintained by the memory manager in the list of buffers will be returned to the memory allocator. Otherwise, the memory manager maintains the amount of buffers equivalent to the difference between T and the total memory usage of all sorters ($\Sigma S_i$), at most. In other words, if B is more than $B_{max}$, buffers will be returned to the memory allocator incrementally until B is less than or equal to $B_{max}$. The use of the min( ) function in the above equation is to handle the scenario when there is no sorter in the data processing system, i.e. $\Sigma S_i = 0$. In this case, the memory manager should return all buffers to the memory allocator. This ensures that the memory manager does not hold on to any memory in the scenario where the data processing system is idle.

As previously described above with respect to FIG. 3, the $S_{limit}$ threshold value is calculated in 310. In certain embodiments the following methodology is used for calculating the value of $S_{limit}$. As an initial determination, a value of $\Sigma S_i$ (i.e., the total memory usage of all sorters determined in 306 in FIG. 3) is compared to the value of T (i.e., memory usage threshold (T) where corrective actions to adjust memory usage will kick in). If $\Sigma S_i < T$, then the memory manager sets $S_{limit}$ to $S_{max}$ (i.e., the parameter that identifies a hard maximum limit on the memory that a sorter can use). In other words, in a data processing system with relative low total memory usage by sorters, each sorter is allowed up to as much memory as $S_{max}$ amount of memory.

If on the other hand, $\Sigma Si$ is greater than or equal to T, then the following methodology is used to calculate the value of $S_{limit}$. For purposes of this methodology, the following variables are used:

$S_{temp}$: denotes a temporary value used while computing $S_{limit}$.

$R_{target}$: denotes the target total memory to be released by the sorters to keep the combined total memory usage of all the sorters ($\Sigma S_i$) below threshold T.

R: denotes the total amount of memory to be released by the sorters.

N: denotes the number of sorters evaluated thus far.

L: denotes the list of $S_i$ determined in 304 in FIG. 3. In certain embodiments, this list is sorted in descending order to facilitate processing.

Methodology for Determining $S_{limit}$

---

$S_{temp} = 0$
$R_{target} = \Sigma S_i - T$
$R = 0$
$N = 0$
For every $S_i$ in L:
   if ($S_i <= S_{temp}$)
     break
   $R = R + S_i$
   $N = N + 1$
   if ($R > R_{target}$)
     $S_{temp} = (R - R_{target})/N$
   else
     $S_{temp} = 0$
$S_{temp} = \max(S_{temp}, S_{min})$
$S_{temp} = \min(S_{temp}, S_{max})$
$S_{limit} = S_{temp}$

---

The following example illustrates how the above methodology works. For this example, the following is assumed:

Example #1

$T = 45$ MB
$S_{min} = 5$ MB
$S_{max} = 40$ MB

Assume there are three sorters: S1 using 30 MB, S2 using 20 MB, and S3 using 10 MB. Thus, $\Sigma S_i$=60 MB. It is further assumed that the sorters are arranged in descending order to facilitate processing.

Based on the above assumptions, Table B shows the progress of the various variables as you progress through the above methodology or algorithm.

TABLE B

Example of $S_{limit}$ Calculation for Example #1

| $S_i$ | $S_{temp}$ | $R_{target}$ | R | N | $S_{limit}$ | Comments |
|---|---|---|---|---|---|---|
| | 0 | 15 | 0 | 0 | | Initialization. $R_{target}$ = 60 – 45 = 15 MB |
| 30 | 15 | 15 | 30 | 1 | | Process first sorter. $S_{temp}$ = (30 – 15)/1 = 15 |
| 20 | 17.5 | 15 | 50 | 2 | | Process second sorter. $S_{temp}$ = (50 – 15)/2 = 17.5 |
| 10 | 17.5 | 15 | 50 | 2 | | Process third sorter. Since (10 < 17.5 ($S_{temp}$)), break out of the loop. |
| | 17.5 | | | | | $S_{temp}$ = max(17.5, 5) = 17.5. This ensures that each sorter is able to use at least the $S_{min}$ amount of memory. |
| | 17.5 | | | | | $S_{temp}$ = min(17.5, 40) = 17.5. |
| | 17.5 | | | | 17.5 | $S_{limit}$ = $S_{temp}$ = 17.5. |

In the above example, $S_{limit}$ is calculated to be 17.5. In response, sorter S1 will reduce its memory usage and free (30–17.5)=12.5 MB; sorter S2 will reduce its memory usage and free (20–17.5)=2.5 MB; sorter S3 will not change anything since its current memory usage is 10 MB, which is below 17.5 MB. The memory buffers released and freed by sorters S1 and S2 may be provided to the memory manager for adding to the list of reusable free buffers instead of to the memory allocator.

In Example #1 above, one possible way to free 15 MB memory ($R_{target}$) would be to simply reduce sorter S1's memory usage by 15 MB. However, such a reduction can have an adverse impact on sorter S1 causing it to more frequently spill data to persistent storage and as a result reducing the efficiency of the sort. It is instead desirable to reduce the overall memory usage such that the reduction is spread across the multiple sorters and each sorter's usage limit is kept as high as possible. One other possible way of reducing the sorters' memory usage by 15 MB would be to set $S_{limit}$ to 15. This would result in the first S1 freeing 15 MD of memory (30–$S_{limit}$=15) and the second S2 releasing 5 MB of its memory (20–$S_{limit}$). This would result in a total of 20 MB being released. While this brings the overall memory usage of the sorters below the desired T threshold of 45 MB, 5 MB of memory has been unnecessarily released leading to under-utilization of available system memory. The $S_{limit}$ calculation methodology described herein avoids these issues and optimizes the utilization of available memory while ensuring that the total memory used by the sorters is below the system configured threshold.

In Example #1, since the amount of memory to be released is 15 MB and S1 and S2 are currently using more than 15 MB of memory, these two sorters are included in the calculation for $S_{limit}$. The calculation logic may be: (30–$S_{limit}$)+(20–$S_{limit}$)=15. $S_{limit}$ is then calculated to be 17.5 MB.

According to certain embodiments, for the methodology described above, once $R_{target}$ is known, all the sorters whose current memory usage is above $R_{target}$ are identified. For example, sorters S1 and S2 in the above example. Then, the value of $S_{limit}$ is calculated based upon the value of Rtarget and the current memory usages of these identified sorters (e.g., in the above example, (30–$S_{limit}$)+(20–$S_{limit}$)=15). Accordingly, the calculation of $S_{limit}$ is influenced by $R_{target}$ and the memory usages of those sorters whose usage is currently over $R_{target}$.

Figure 6A:
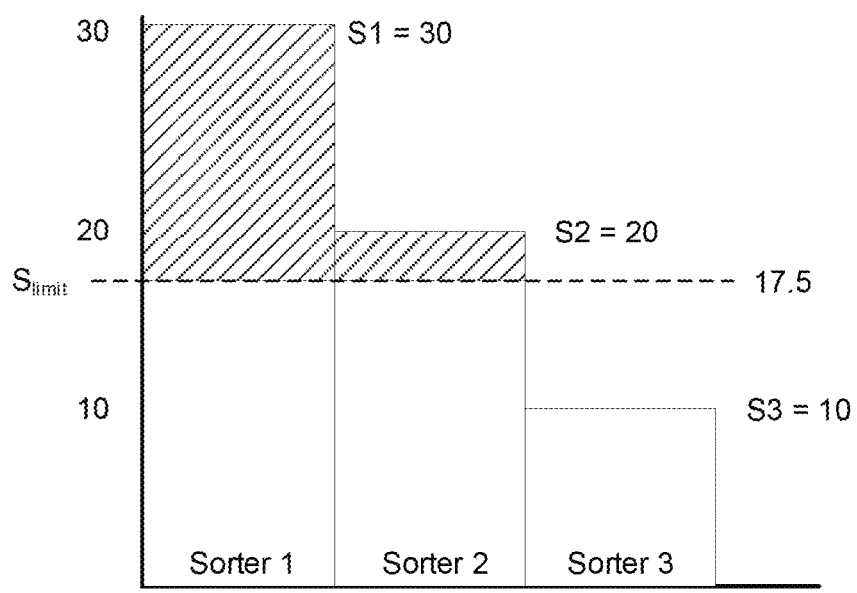
FIGS. 6A-6D visually illustrate how sorters respond to periodically calculated values of $S_{limit}$ according to certain embodiments.
Figure 6B:
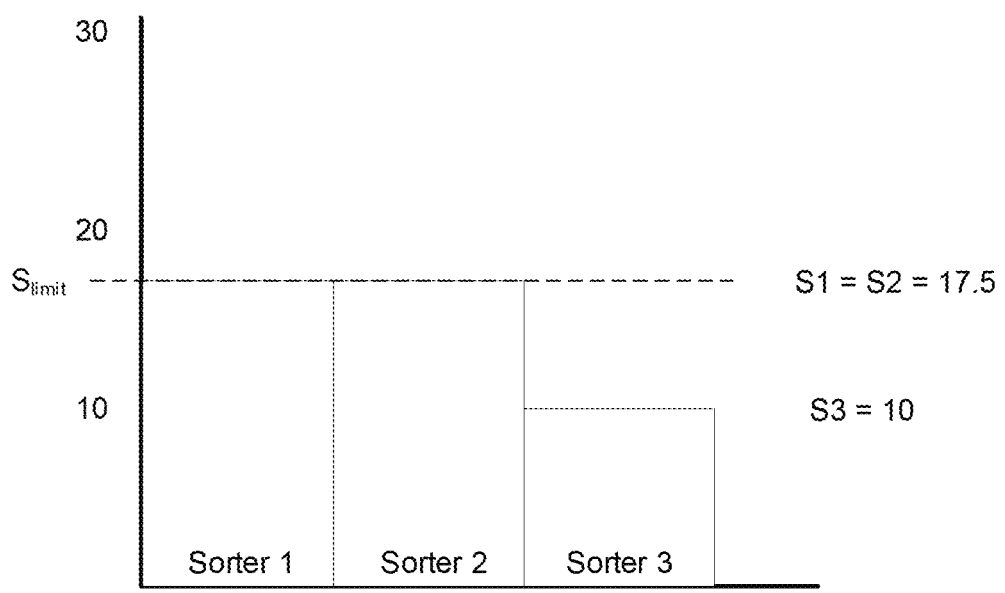

FIGS. 6A and 6B visually illustrate Example #1 described above. As depicted in FIG. 6A, three sorters S1, S2, and S3 may be executing in parallel on a data processing system. Sorter S1 currently uses 30 MB of memory, sorter S2 uses 20 MB of memory, and sorter S3 uses 10 MB of memory. Thus, the total amount of memory usage across all sorters is 60 MB ($\Sigma S_i$=60 MB). $S_{limit}$ is calculated to be 17.5 MB. FIG. 6B shows the effect of the sorters responding to the $S_{limit}$ of 17.5 MB. As depicted in FIG. 6B, sorter S1 reduces its memory usage by 12.5 MB such that its usage is equal to 17.5 MB. Sorter S2 reduces its memory usage by 2.5 MB such that is usage is equal to 17.5 MB. Sorter S3 does not have to do any memory adjustment.

Figure 6C:
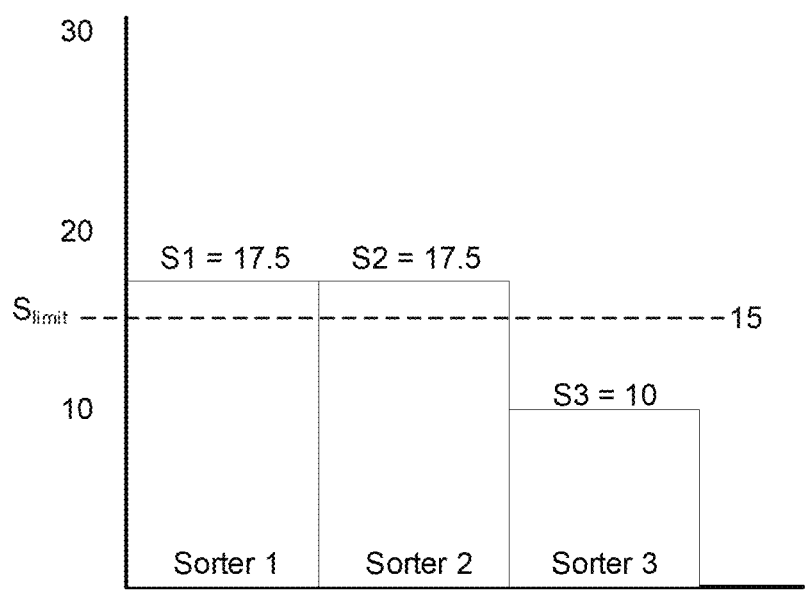
Figure 6D:
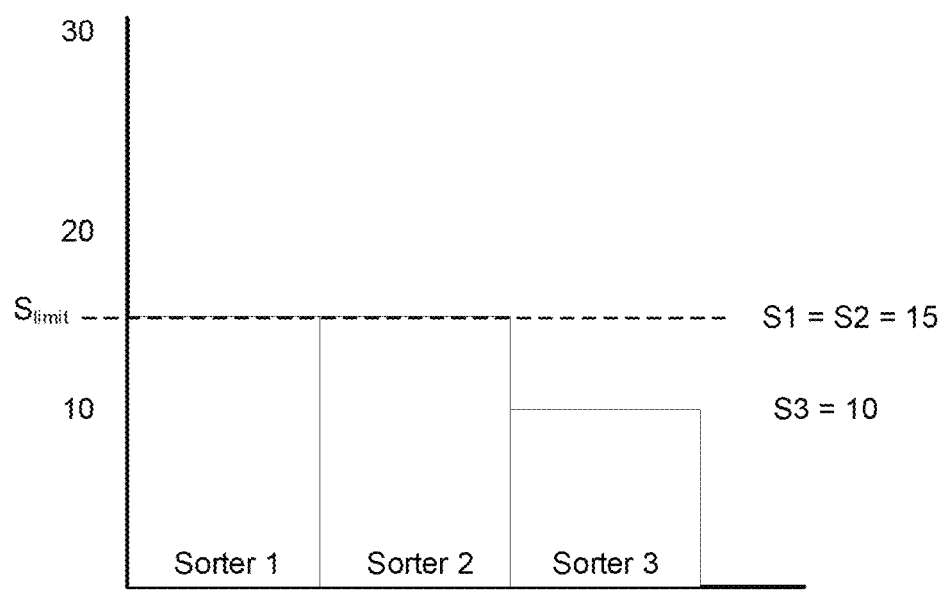

As described above, $S_{limit}$ is calculated on a periodic basis. Thus, the $S_{limit}$ of 17.5 MB applies for a time period from when the $S_{limit}$ was calculate until the calculation of a new $S_{limit}$. For example, if the periodicity is every 25 ns, a new value of $S_{limit}$ (which could be the same value as the previous value) is calculated every 25 ns. In FIG. 6C, it is assumed that during the next cycle, the value of $S_{limit}$ is calculated as 15 MB. FIG. 6C also assumes that the memory usage of the three sorters has remained that same at 17.5 MB, 17.5 MB, and 10 MB. FIG. 6D shows the effect of the sorters responding to the $S_{limit}$ of 15 MB. As depicted in FIG. 6D, sorter S1 reduces its memory usage by 2.5 MB such that its usage is equal to 15 MB. Sorter S2 reduces its memory usage by 2 MB such that is usage is equal to 15 MB. Sorter S3 does not have to do any memory adjustment.

Figure 5:
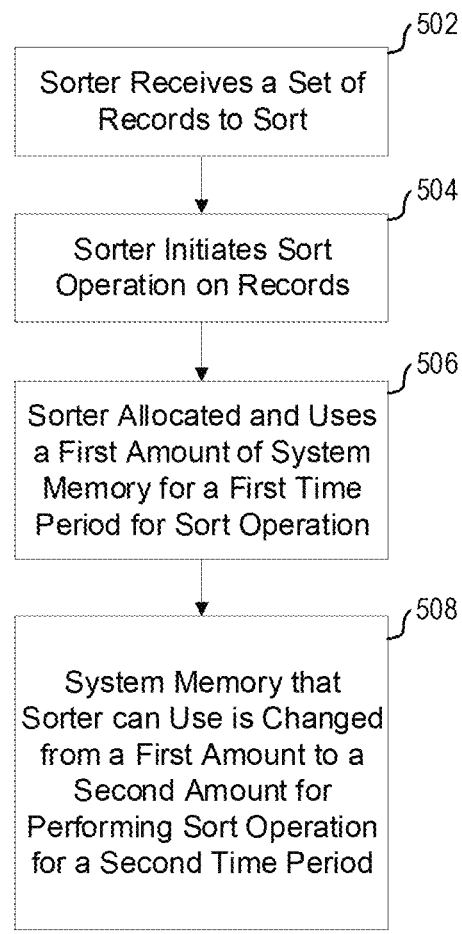
FIG. 5 depicts a simplified flow chart depicting how the memory used by a sorter may change from one time period to another according to certain embodiments.

FIG. 5 depicts a simplified flow chart depicting how the memory used by a sorter may change from one time period to another according to certain embodiments. The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel.

At 502, a sorter may start executing and receive a set of records to sort. At 504, the sorter may start the sort operation by getting a first amount of system memory for a first time period. The memory obtained in 504 by the sorter may be obtained from the memory allocator or from the list of reusable buffers maintained by the memory manager.

At block 506, at a first time point, the sorter may determine the latest value of $S_{limit}$ calculated by the memory manager, where the $S_{limit}$ indicates the allowable memory usage for the sorter for a time period starting at the first time point. As part of 506, the sorter may have to reduce its memory usage to comply with the $S_{limit}$ threshold for the first period. At block 508, at a second time point after the first time point, the sorter may determine yet another latest value of $S_{limit}$ calculated by the memory manager, where the $S_{limit}$ indicates the allowable memory usage for the sorter for a second time period starting at the second time point. As part of 508, the sorter may have to further reduce its memory usage to comply with the $S_{limit}$ threshold for the second period. In this manner, the allowable memory used by a sorter can change dynamically from one time period to another during the lifetime of the sorter.

For this example, it is assumed that T is calculated to be 45 MB. During its periodic processing, the memory manager may determine that ΣSi>T (i.e., 60 MB-45 MB). The memory manager may then calculate a value for $S_{limit}$ to reduce the amount of total memory used by the sorters such that the ΣSi is equal to or less than 45. Thus, the memory amount that needs to be released by the sorters is 15 MB (60 MB−45 MB).

The memory management techniques described herein provide several benefits over conventional techniques. The techniques are respectful of heterogeneity. Thus, if there is one large sort (a sort that is sorting large amounts of data) and many small sorts executed by the data processing system, the large sort gets the lion's share of memory. The memory resources allocated to the small sorts are commensurate with their needs. The techniques described herein manage overall memory usage responsive to the overall load and memory usage of the data processing system. The maximum limit of memory that can be allocated to a sorter is not fixed but is dynamic in response to overall memory usage. For example, a large sort can continue to receive additional memory as long as the overall memory limits for the sorters is not violated. Further, when the overall memory usage of the system changes (e.g., when multiple sorters have started executing each with their own memory requirements), the amount of memory used by the large sorter can be dynamically reduced based upon the periodic and dynamic calculation of $S_{limit}$. When a sorter's memory is to be reduced, the sorter can release it quickly. The sorter may release any locally cached, unused memory immediately and release any used memory incrementally as it writes it sorted data to persistent storage (e.g., disk).

According to certain embodiments described in this disclosure, sorters performing small sorts are not starved of memory. In particular, a sorter entering the system is always guaranteed some amount of memory even if the system is at capacity. The $S_{limit}$ can be exceeded if needed in order to achieve this.

According to certain embodiments, memory management is performed in a manner that results in the fewest possible disk runs or disk spills, to maximize the chances of sorts being able to be done entirely in memory as much as possible. The techniques described herein also cause minimum possible synchronization between sorts.

The teachings described herein can be used in various different settings and contexts. In one such example, the teachings may be used by an analytics server that is configured to receive a large amount of data records and has to perform various types of analyses on the records, where the analyses involve sorting off the data records. For example, Oracle Corporation® provides an Analytics Server that acts as a query and analysis engine for multiple Oracle Business Intelligence (BI) offerings, such as including Oracle Data Visualization Desktop. Oracle Data Visualization Desktop's user interface is a tool called Visual Analyzer, which allows business users to visualize and explore their data using rich visualizations. The Visual Analyzer analyses data and provides business users with various visualizations (e.g., graphs, pie charts, etc.) that allow business users to better interpret and comprehend the mountains of data that has been collected in order to draw inferences and arrive at conclusions. Once the Visual Analyzer is provided user inputs laying out the parameters of the analysis to be performed, the Visual Analyzer generates and issues SQL statements to Oracle BI Analytics Server. The Server processes these SQL statements and returns the relevant data, which is then presented by Visual Analyzer to the business users using various forms of visualization, e.g. pie charts, line graphs, etc. The execution of the SQL statements by the Server can generate a large amount of the data records that have to be sorted before the server can return the relevant data to the Visual Analyzer, depending on the needs of the business user. For example, a sort operation may need to be performed on the data records within the database in order to identify all the data records of a certain characteristic (e.g., all items of type "A"). The teachings describe in the disclosure may be used by the Server to perform these sorts in an efficient manner.

Figure 7:
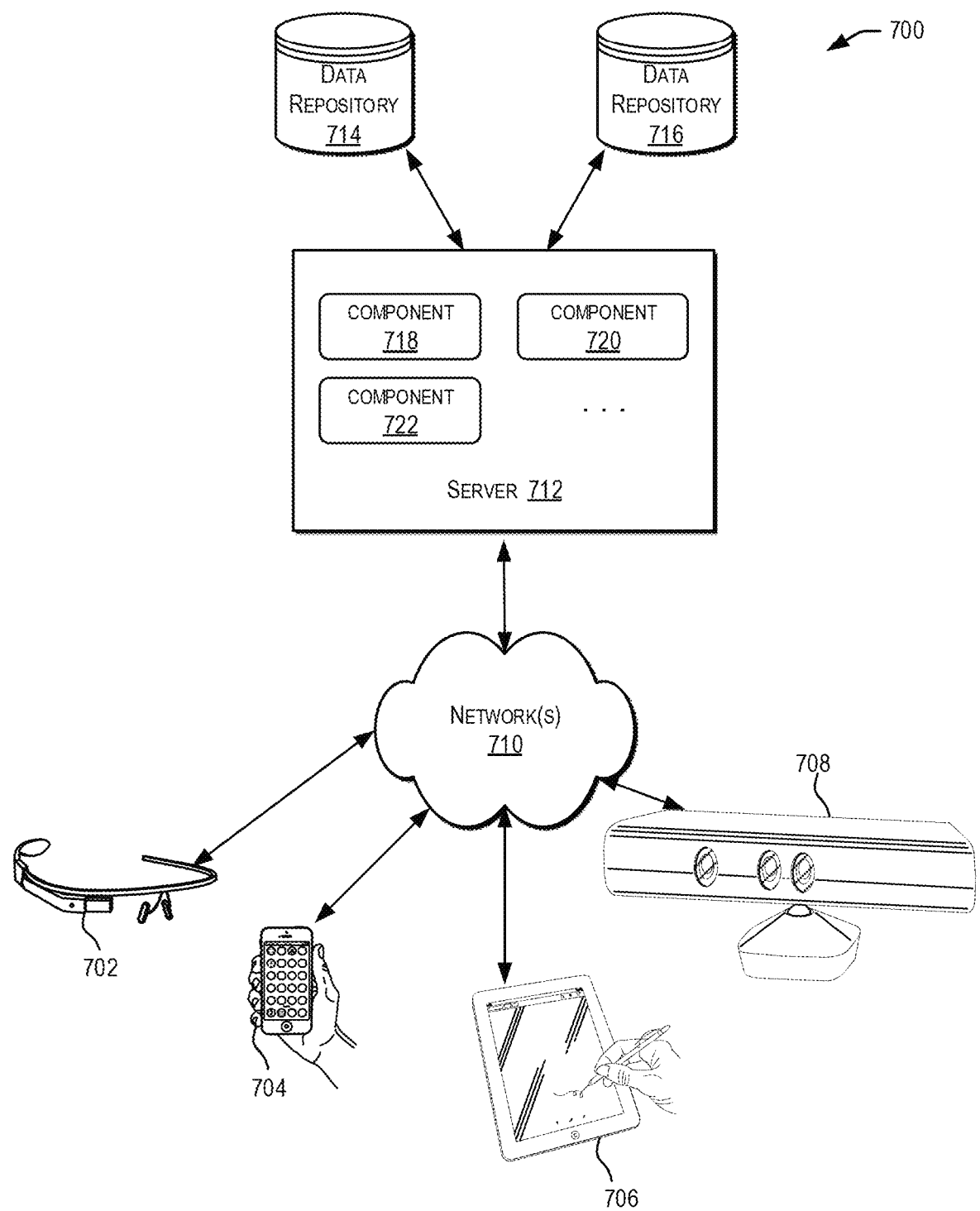
FIG. 7 depicts a simplified diagram of a distributed system for implementing certain embodiments.

FIG. 7 depicts a simplified diagram of a distributed system 700 for implementing an embodiment. In the illustrated embodiment, distributed system 700 includes one or more client computing devices 702, 704, 706, and 708, coupled to a server 712 via one or more communication networks 710. Clients computing devices 702, 704, 706, and 708 may be configured to execute one or more applications.

In various embodiments, server 712 may be adapted to run one or more services or software applications that enable the memory management techniques described herein.

In certain embodiments, server 712 may also provide other services or software applications that can include non-virtual and virtual environments. In some embodiments, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, and/or 708 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization such as one or more flexible pools of logical storage devices that can be virtualized to maintain virtual storage devices for the server. In various embodiments, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain embodiments. Data repositories 714, 716 may be of different types. In certain embodiments, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 714, 716 may also be used by applications to store application data. The data repositories used by applications may be of different types such as, for example, a key-value store repository, an object store repository, or a general storage repository supported by a file system.

Figure 8:
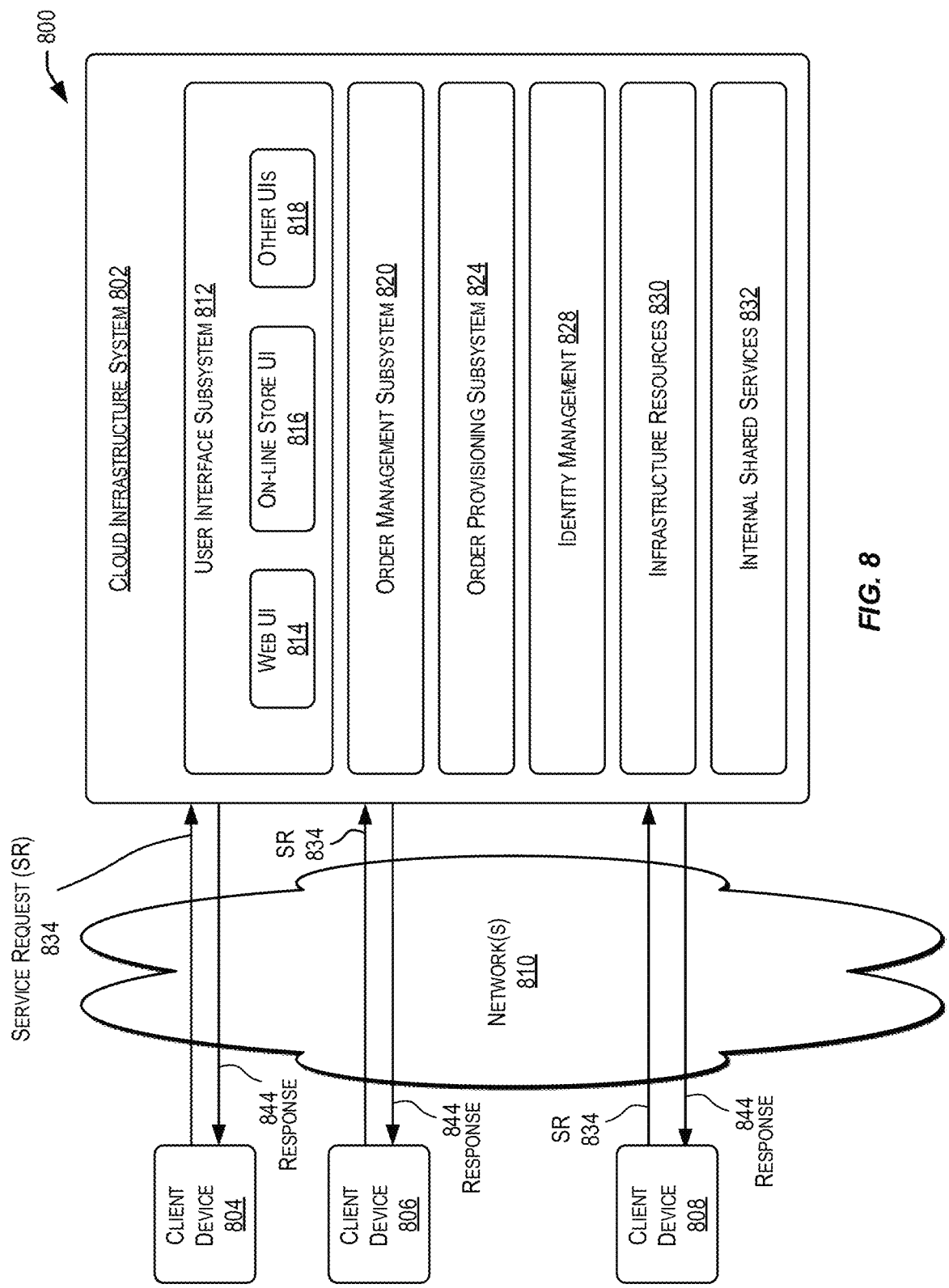
FIG. 8 is a simplified block diagram of a cloud-based system environment in which memory management-related services may be offered as cloud services, in accordance with certain embodiments.

In certain embodiments, the memory management-related functionalities described in this disclosure may be offered as services via a cloud environment. FIG. 8 is a simplified block diagram of a cloud-based system environment in which memory management-related services may be offered as cloud services, in accordance with certain embodiments. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other embodiments, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative embodiments.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer can be an individual or an enterprise. In certain other embodiments, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802.

In some embodiments, the processing performed by cloud infrastructure system 802 for providing services may involve big data analysis. This analysis may involve using, analyzing, and manipulating and sorting large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain embodiments, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to.

In certain embodiments, such as the embodiment depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain embodiments, cloud infrastructure system 802 comprises an identity management subsystem (IMS) 828 that is configured to manage customers information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
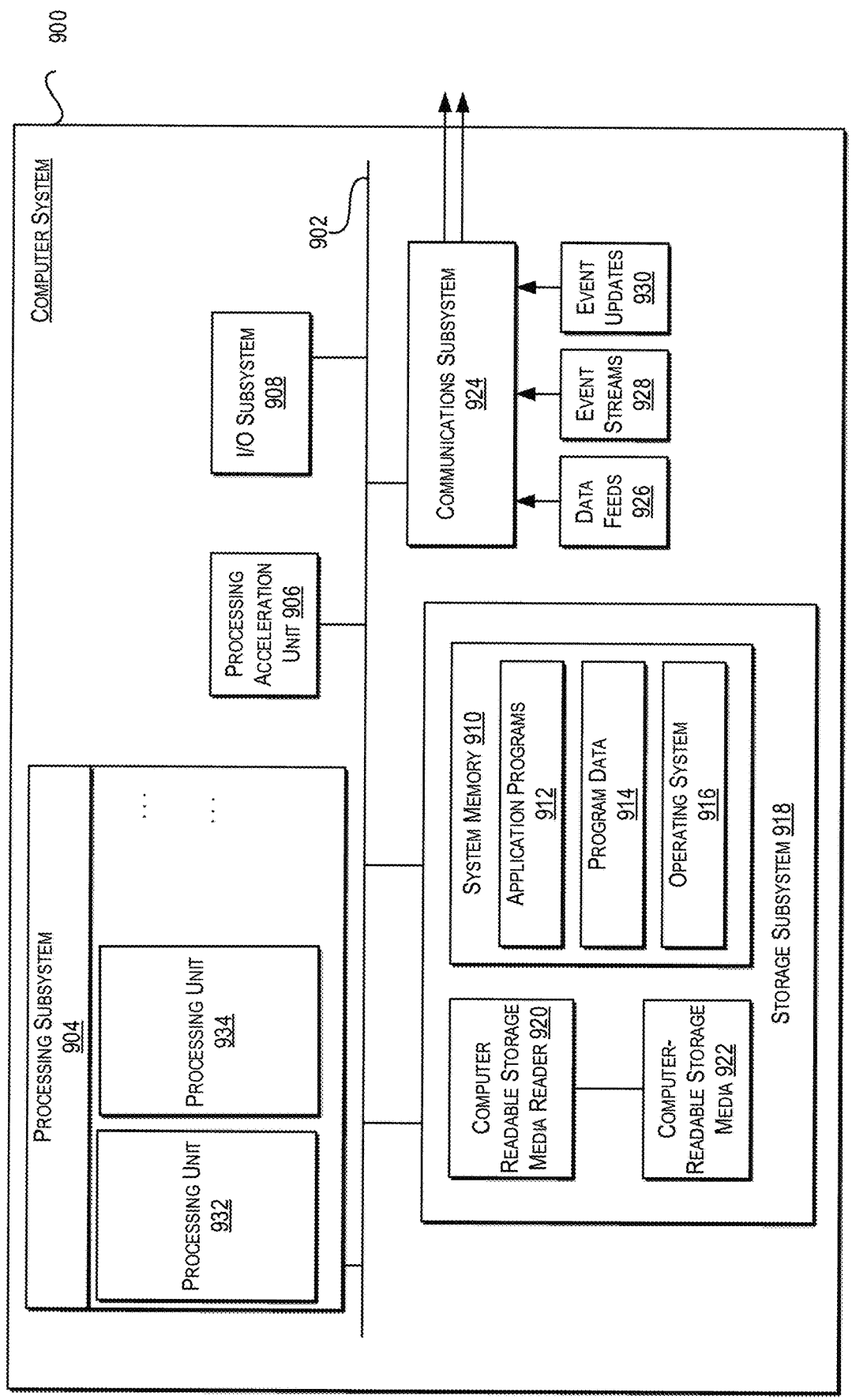
FIG. 9 illustrates an exemplary computer system that may be used to implement certain embodiments.

FIG. 9 illustrates an exemplary computer system 900 that may be used to implement certain embodiments. For example, in some embodiments, computer system 900 may be used to implement data processing system 100 depicted in FIG. 1. Data processing system 100 may comprise one or more computer systems 900. Computer system 900 may also be used to perform the various processing described in this disclosure. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®. Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some embodiments. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Reader 920 may receive and be configured to read data from a memory device such as a disk, a flash drive, etc.

In certain embodiments, computer system 900 may support virtualization technologies, including but not limited to virtualization of processing and memory resources. For example, computer system 900 may provide support for executing one or more virtual machines. In certain embodiments, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:

executing, by a data processing system, a plurality of sorters, each sorter in the plurality of sorters configured to perform a sort operation, the data processing system comprising one or more processors and associated memory;

executing, by the data processing system, a memory allocator, the memory allocator configured to allocate memory for the plurality of sorters;

executing, by the data processing system, a memory manager, the memory manager configured to manage a list of usable buffers and allocate the usable buffers for the plurality of sorters, wherein each buffer of the usable buffers is a contiguous chunk of memory that is separate from the memory allocated by the memory allocator;

determining, by the memory manager, a current memory usage for each sorter in the plurality of sorters;

based upon the current memory usage determined for each sorter in the plurality of sorters, determining, by the memory manager, a first sorter total value indicative of the total memory usage of the plurality of sorters;

determining that the first sorter total value exceeds a first threshold value;

responsive to determining that the first sorter total value exceeds the first threshold, calculating, by the memory manager, a first per-sorter limit value based upon the first sorter total value and the first threshold value; and for each sorter in the plurality of sorters whose current memory usage exceeds the first per-sorter limit value, releasing an amount of memory used by the sorter, wherein an amount of memory used by the sorter after the releasing is equal to or less than the first per-sorter limit, wherein the releasing comprises: (i) releasing a first amount of memory used by a first sorter from the plurality of sorters, (ii) providing the first amount of memory released from the first sorter to the memory manager; and (iii) adding, by the memory manager, the first amount of memory released from the first sorter to the list of usable buffers managed by the memory manager.

2. The method of claim 1, further comprising:

receiving, by the memory manager, a request for memory from a second sorter from the plurality of sorters; and responsive to receiving the request, providing to the second sorter by the memory manager from the list of usable buffers, at least a portion of the first amount of memory released from the first sorter.

3. The method of claim 1, further comprising:

executing, by the data processing system, a memory allocator, the memory allocator configured to allocate memory for the plurality of sorters, wherein the first amount of memory released by the first sorter is memory allocated to the first sorter by the memory allocator; and upon determining that the first sorter total value exceeds the first threshold value releasing, by the memory manager, at least a portion of the list of usable buffers to the memory allocator.

4. The method of claim 1, further comprising:

determining, by the memory manager, a first parameter configured for the data processing system, the first parameter identifying a maximum amount of memory that can be used on the data processing system for sorting operation;

determining, by the memory manager, a second parameter configured for the data processing system, the second parameter identifying a memory usage threshold when corrective actions to adjust memory usage of the plurality of sorters is to be performed; and determining the first threshold value based upon the first parameter and the second parameter.

5. The method of claim 1, wherein calculating the first per-sorter limit value comprises:

determining, by the memory manager, based on the first sorter total value and the first threshold value, a target total memory value indicative of an amount of memory to release;

determining, by the memory manager, a subset of sorters from the plurality of sorters, wherein each sorter from the plurality of sorters whose current memory usage exceeds the target total memory value is included in the subset of sorters;

determining, by the memory manager, the first per-sorter limit value based on the sorters in the subset of sorters and their current memory usages, and the target total memory value.

6. The method of claim 1, further comprising:

after expiration of a period of time after calculation of the first per-sorter limit value:

determining, by the memory manager, an updated current memory usage for each sorter in the plurality of sorters;

based upon the updated current memory usage determined for each sorter in the plurality of sorters, determining, by the memory manager, a second sorter total value indicative of the total memory usage of the plurality of sorters;

determining that the second sorter total value exceeds the first threshold value;

responsive to determining that the second sorter total value exceeds the first threshold, calculating, by the memory manager, a second per-sorter limit value based upon the second sorter total value and the first threshold value, wherein the second per-sorter limit value is different from the first per-sorter limit value; and for each sorter in the plurality of sorters whose updated memory usage exceeds the second per-sorter limit value, releasing an amount of memory used by the sorter, wherein an amount of memory used by the sorter after the releasing is equal to or less than the second per-sorter limit.

7. The method of claim 1, wherein determining, by the memory manager, the current memory usage for each sorter in the plurality of sorters comprises:
for each sorter in the plurality of sorters, the sorter communicating its current memory usage information to the memory manager.

8. The method of claim 1, wherein the releasing the amount of memory used by the sorter is performed by the sorter.

9. A non-transitory computer-readable medium containing instructions that, when executed by a processor, causes the processor to:
execute a plurality of sorters, each sorter in the plurality of sorters configured to perform a sort operation, the data processing system comprising one or more processors and associated memory;
execute a memory allocator, the memory allocator configured to allocate memory for the plurality of sorters;
execute a memory manager, the memory manager configured to manage a list of usable buffers and allocate the usable buffers for the plurality of sorters, wherein each buffer of the usable buffers is a contiguous chunk of memory that is separate from the memory allocated by the memory allocator;
determine, by the memory manager, a current memory usage for each sorter in the plurality of sorters;
based upon the current memory usage determined for each sorter in the plurality of sorters, determine, by the memory manager, a first sorter total value indicative of the total memory usage of the plurality of sorters;
determine that the first sorter total value exceeds a first threshold value;
responsive to determining that the first sorter total value exceeds the first threshold, calculate, by the memory manager, a first per-sorter limit value based upon the first sorter total value and the first threshold value; and
for each sorter in the plurality of sorters whose current memory usage exceeds the first per-sorter limit value, release an amount of memory used by the sorter, wherein an amount of memory used by the sorter after the releasing is equal to or less than the first per-sorter limit, wherein the releasing comprises: (i) releasing a first amount of memory used by a first sorter from the plurality of sorters, (ii) providing the first amount of memory released from the first sorter to the memory manager; and (iii) adding, by the memory manager, the first amount of memory released from the first sorter to the list of usable buffers managed by the memory manager.

10. The non-transitory computer-readable medium of claim 9,
the instructions, when executed by the processor, further cause the processor to:
receive, by the memory manager, a request for memory from a second sorter from the plurality of sorters; and
responsive to receiving the request, provide to the second sorter by the memory manager from the list of usable buffers, at least a portion of the first amount of memory released from the first sorter.

11. The non-transitory computer-readable medium of claim 9, wherein the instructions, when executed by the processor, further cause the processor to:
execute, by the data processing system, a memory allocator, the memory allocator configured to allocate memory for the plurality of sorters, wherein the first amount of memory released by the first sorter is memory allocated to the first sorter by the memory allocator;
upon determining that the first sorter total value exceeds the first threshold value, release, by the memory manager, at least a portion of the list of usable buffers to the memory allocator.

12. The non-transitory computer-readable medium of claim 9, wherein the instructions, when executed by the processor, further cause the processor to:
determine, by the memory manager, a first parameter configured for the data processing system, the first parameter identifying a maximum amount of memory that can be used on the data processing system for sorting operation;
determine, by the memory manager, a second parameter configured for the data processing system, the second parameter identifying a memory usage threshold when corrective actions to adjust memory usage of the plurality of sorters is to be performed; and
determine the first threshold value based upon the first parameter and the second parameter.

13. The non-transitory computer-readable medium of claim 9, wherein the instructions, when executed by the processor, further cause the processor to:
determine, by the memory manager, based on the first sorter total value and the first threshold value, a target total memory value indicative of an amount of memory to release;
determine, by the memory manager, a subset of sorters from the plurality of sorters, wherein each sorter from the plurality of sorters whose current memory usage exceeds the target total memory value is included in the subset of sorters;
determine, by the memory manager, the first per-sorter limit value based on the sorters in the subset of sorters and their current memory usages, and the target total memory value.

14. A data processing system for performing a memory adaptive sort, the system comprising:
one or more processors and associated memory;
a plurality of sorters, each sorter in the plurality of sorters configured to perform a sort operation, and wherein each sorter in the plurality of sorters is further configured to:
determine a current memory usage of the respective sorter exceeds a first per-sorter limit value; and
release an amount of memory used by the respective sorter, wherein an amount of memory used by the sorter after the releasing is equal to or less than the first per-sorter limit;
a memory allocator, the memory allocator configured to allocate memory for the plurality of sorters;
a memory manager, wherein the memory manager is configured to:
manage a list of usable buffers and allocate the usable buffers for the plurality of sorters, wherein each buffer of the usable buffers is a contiguous chunk of memory that is separate from the memory allocated by the memory allocator
determine the current memory usage for each sorter in the plurality of sorters;
based upon the current memory usage determined for each sorter in the plurality of sorters, determine a first sorter total value indicative of the total memory usage of the plurality of sorters;

determine that the first sorter total value exceeds a first threshold value; and responsive to determining that the first sorter total value exceeds the first threshold, calculate the first per-sorter limit value based upon the first sorter total value and the first threshold value, wherein the releasing comprises: (i) releasing a first amount of memory used by a first sorter from the plurality of sorters, (ii) providing the first amount of memory released from the first sorter to the memory manager; and (iii) adding, by the memory manager, the first amount of memory released from the first sorter to the list of usable buffers managed by the memory manager.

15. The data processing system of claim 14, wherein the memory manager is further configured to:

determine a first parameter configured for the data processing system, the first parameter identifying a maximum amount of memory that can be used on the data processing system for sorting operation;

determine a second parameter configured for the data processing system, the second parameter identifying a memory usage threshold when corrective actions to adjust memory usage of the plurality of sorters is to be performed; and determine the first threshold value based upon the first parameter and the second parameter.

16. The data processing system of claim 14, wherein the memory manager is further configured to:

determine based on the first sorter total value and the first threshold value, a target total memory value indicative of an amount of memory to release;

determine a subset of sorters from the plurality of sorters, wherein each sorter from the plurality of sorters whose current memory usage exceeds the target total memory value is included in the subset of sorters;

determine the first per-sorter limit value based on the sorters in the subset of sorters and their current memory usages, and the target total memory value.

17. The data processing system of claim 14, wherein the memory manager is further configured to, after expiration of a period of time after calculation of the first per-sorter limit value:

determine an updated current memory usage for each sorter in the plurality of sorters;

based upon the updated current memory usage determined for each sorter in the plurality of sorters, determine a second sorter total value indicative of the total memory usage of the plurality of sorters;

determine that the second sorter total value exceeds the first threshold value; and responsive to determining that the second sorter total value exceeds the first threshold, calculate a second per-sorter limit value based upon the second sorter total value and the first threshold value, wherein the second per-sorter limit value is different from the first per-sorter limit value.

* * * * *